United States Patent
Bridges et al.

(10) Patent No.: US 7,272,391 B2
(45) Date of Patent: Sep. 18, 2007

(54) SWITCH-BASED CALL PROCESSING WITH DETECTION OF VOICE PATH CONNECTION BETWEEN MULTIPLE TRUNKS IN EXTERNAL NETWORK

(75) Inventors: Sydney D. Bridges, Middletown, NJ (US); Stephen M. Milton, Freehold, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 755 days.

(21) Appl. No.: 10/388,156

(22) Filed: Mar. 13, 2003

(65) Prior Publication Data
US 2004/0180651 A1 Sep. 16, 2004

(51) Int. Cl.
*H04Q 7/20* (2006.01)
*H04M 3/42* (2006.01)

(52) U.S. Cl. .................. 455/426.2; 455/414.1
(58) Field of Classification Search .......... 455/426.2, 455/414.1; 379/246, 201.12, 221.14, 233, 379/234, 201.01
See application file for complete search history.

(56) References Cited

U.S. PATENT DOCUMENTS

| | | | |
|---|---|---|---|
| 6,038,302 A | | 3/2000 | Burok et al. |
| 6,169,797 B1 * | | 1/2001 | Wildgrube et al. ......... 379/266 |
| 6,304,652 B1 * | | 10/2001 | Wallenius .................. 379/230 |
| 6,516,061 B2 * | | 2/2003 | Horowitz et al. .......... 379/233 |
| 6,801,612 B2 * | | 10/2004 | Malcolm et al. ......... 379/202.01 |
| 6,922,466 B1 * | | 7/2005 | Peterson et al. ......... 379/88.09 |
| 2003/0152209 A1 * | | 8/2003 | Andreason | |

OTHER PUBLICATIONS

U.S. Appl. No. 09/908,155, filed Jul. 18, 2001, "Method and Apparatus for Treating Externally-Originated Calls as Coming from Internal Switch Extensions."
U.S. Appl. No. 09/908,156, filed Jul. 18, 2001, "Method and Apparatus for Extending Calls to Internal Switch Extensions Out to External Network Endpoints."
International Standard ISO/IEC 13874:1995, "Information Technology-Telecommunications and Information Exchange Between Systems-Private Integrated Services Network-Inter-exchange Signalling Protocol-Path Replacement Additional Network Feature."

* cited by examiner

Primary Examiner—William J. Deane, Jr.
(74) Attorney, Agent, or Firm—Ryan, Mason & Lewis, LLP

(57) ABSTRACT

A private branch exchange (PBX) or other communication system switch is configured to establish connections for at least first and second calls associated with an external endpoint, using respective first and second trunks. Upon detection of a voice path connection between the first and second calls in a network external to the switch, the switch conferences the first and second calls together within the switch and drops at least one of the trunk connections. The switch may detect the voice path connection using an active approach in which a designated signal is generated on one of the first and second trunks and a determination is made as to whether the designated signal is detected on the other trunk. As another example, the switch may detect the voice path connection using a passive approach which involves monitoring the first and second trunks to determine whether they are connected in the external network.

18 Claims, 3 Drawing Sheets

SWITCH-BASED CALL PROCESSING WITH DETECTION OF VOICE PATH CONNECTION BETWEEN MULTIPLE TRUNKS IN EXTERNAL NETWORK

FIELD OF THE INVENTION

The invention relates generally to call processing in communication systems, and more particularly to systems in which calls or other communications are directed by a switch to or from wired or wireless telephones or other types of user terminals.

BACKGROUND OF THE INVENTION

Conventional communication system switches, such as private branch exchanges (PBXs) and other premises-based telephone switches, generally support a wide variety of useful features, such as bridged call appearances, hunt groups, call forwarding, navigable directories, multi-call conferencing, etc.

However, these and other switch-based features are typically provided only to those user terminals that represent internal extensions within the premises serviced by the switch. As a result, a user terminal associated with an external network is generally unable to avail itself of the full set of features supported by the switch.

By way of example, a mobile telephone or other mobile device representing a given external endpoint of the system generally cannot be treated as an internal extension of a conventional switch. A call directed from an internal extension of the switch to the given endpoint therefore must be processed as any other call to an endpoint of an external network, even if the given external endpoint is a device known to be associated with a user of an internal extension of the switch.

It is known in the art to implement call forwarding routines that will allow a call directed from one internal extension to another to be forwarded to a designated mobile telephone or other endpoint of an external network. However, in conventional call forwarding, the designated mobile telephone is not treated as if it were an internal extension serviced by the switch, and is generally unable to access many desirable features of the switch. Conventional switches are thus typically unable to extend switch-based features to such a call in an efficient and cost-effective manner.

Techniques for addressing this problem are described in U.S. patent application Ser. No. 09/908,155 entitled "Method and Apparatus for Treating Externally-Originated Calls as Coming from Internal Switch Extensions," and U.S. patent application Ser. No. 09/908,156 entitled "Method and Apparatus for Extending Calls to Internal Switch Extensions out to External Network Endpoints," both filed Jul. 18, 2001 in the name of inventor Stephen M. Milton, commonly assigned herewith and incorporated by reference herein. Advantageously, these techniques allow mobile telephones and other external system endpoints to access premises-based communication switch features in a manner similar to an internal extension serviced by the switch.

As described in the above-cited U.S. patent application Ser. No. 09/908,156, it is possible for a single external endpoint, such as an endpoint referred to therein as an "Xmobile" endpoint, to support simultaneously multiple calls each associated with a different trunk. As a more particular example, it is possible for the switch to be configured such that two calls may be directed to a given registered external endpoint using two different trunks, each associated with a different external port of the switch. However, such an arrangement generally utilizes the two different trunks even under a conference or transfer condition in which an external voice connection is established between the two trunk calls in an external network, e.g., an external wireless cellular network.

Therefore, despite the considerable advantages provided by the techniques described the above-cited applications, a need remains for further improvements in switch-based call processing, particularly with regard to the handling of multiple trunks associated with calls supported by a single external endpoint.

SUMMARY OF THE INVENTION

The present invention provides methods and apparatus for switch-based call processing involving detection of a voice path connection in an external network between calls supported by a single external endpoint and associated with multiple trunks.

In accordance with one aspect of the invention, a private branch exchange (PBX) or other communication system switch is configured to establish connections for at least first and second calls associated with an external endpoint, using respective first and second trunks. The external endpoint is preferably registered with the switch in such a manner that the external endpoint may be treated substantially as if it were an internal switch extension. Upon detection of a voice path connection between the first and second calls in a network external to the switch, the switch conferences the first and second calls together within the switch and drops at least one of the trunk connections.

In accordance with another aspect of the invention, the switch may detect the voice path connection by generating a designated signal on one of the first and second trunks and determining if the designated signal is detected on the other trunk. In such an arrangement, it is preferable that the voice path connection be end-to-end digital without compression. The designated signal may comprise a modulated signal or an unmodulated signal. An example of an unmodulated signal is a low volume tone pattern.

In accordance with a further aspect of the invention, the switch may detect the voice path connection by monitoring the first and second trunks to determine whether they are connected in the external network. For example, the switch may determine that the first and second trunks are connected in the external network if one of the trunks is echoing a signal on another one of the trunks, or if substantially simultaneous voice energy is detected on both trunks.

Advantageously, the invention allows a communication system switch to determine when a voice path connection external to the switch has been established between two or more trunk calls associated with a given external endpoint. The switch upon detection of such a condition can drop trunk connections associated with one or more of the calls, thereby conserving trunk usage and increasing the call handling capacity of the switch. A switch configured in accordance with the invention is thus better able to optimize the use of its trunk-related resources.

DETAILED DESCRIPTION OF THE INVENTION

The invention will be illustrated below in conjunction with an exemplary communication system. Although well suited for use with, e.g., a system having a private branch exchange (PBX) or other similar call processing switch, the invention is not limited to use with any particular type of communication system switch or configuration of system elements. Those skilled in the art will recognize that the disclosed techniques may be used in any communication application in which it is desirable to provide improved control of system resources associated with multiple calls supported by an external endpoint. The term "call" as used herein is intended to include not only telephone calls but also non-telephonic communications such as data transmissions, facsimile transmissions, voice-over-IP communications, Session Initiation Protocol (SIP) communications, etc.

Figure 1:
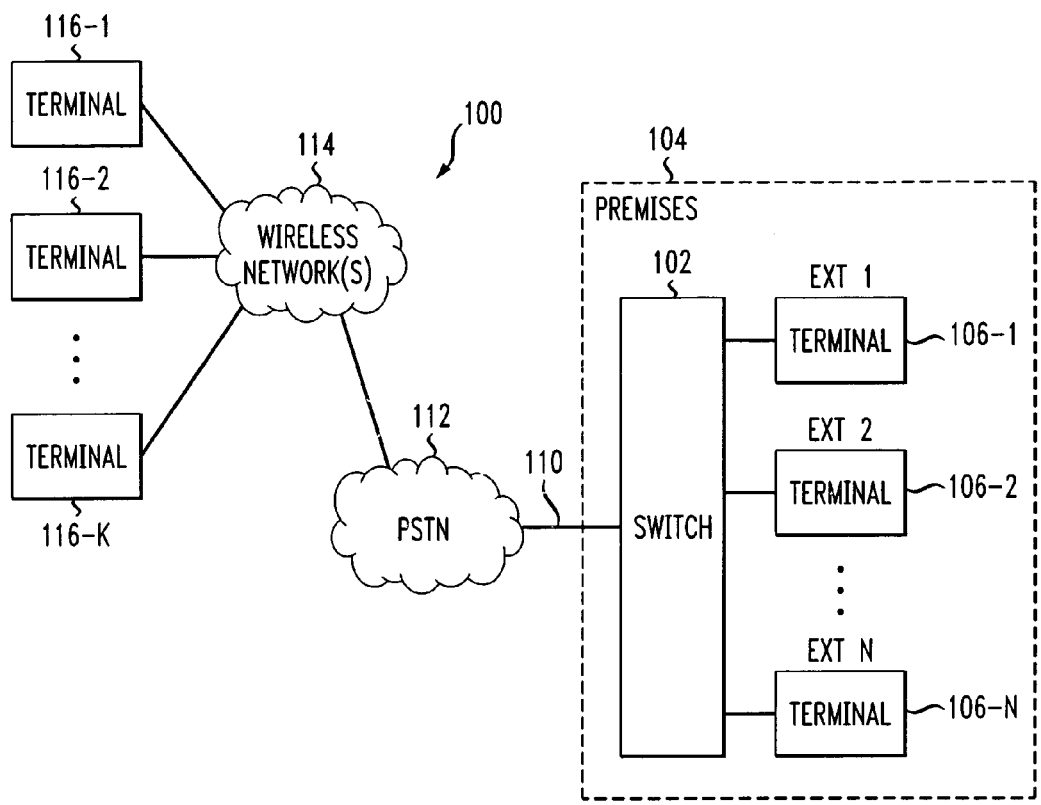
FIG. 1 shows an exemplary communication system in which the invention is implemented.

FIG. 1 shows an exemplary communication system 100 in which the invention is implemented. The system 100 includes a switch 102 which serves a premises 104 having a number of terminals 106-1, 106-2, . . . 106-N. Each of the terminals 106-1, 106-2, . . . 106-N corresponds to one of a set of internal extensions Ext1, Ext2, . . . ExtN as shown. These extensions are referred to herein as "internal" in that they are extensions within the premises 104 that are directly serviced by the switch. More particularly, these extensions correspond to conventional terminal endpoints serviced by the switch, and the switch can direct incoming calls to and receive outgoing calls from these extensions in a conventional manner.

The term "switch" as used herein should be understood to include a PBX, an enterprise switch, or other type of telecommunications system switch, as well as other types of processor-based communication control devices such as servers, computers, adjuncts, etc.

By way of example, the switch 102 in the illustrative embodiment may be implemented as an otherwise conventional DEFINITY® Enterprise Communication Service (ECS) communication system switch, available from Avaya Inc. of Basking Ridge, N.J., USA.

Details regarding conventional aspects of the DEFINITY® ECS may be found in DEFINITY® ECS, Release 9, Administrator's Guide, Document No. 555-233-506, and Administration for Network Connectivity, Document No. 555-233-504, November 2000, both of which are incorporated by reference herein.

Another example switch suitable for use in conjunction with the present invention is the MultiVantage™ communication system switch, also available from Avaya Inc.

Other types of known switches may also be used. The conventional aspects of these and other communication system switches suitable for use with the present invention are well known in the art and therefore not described in detail herein.

The terminals 106 may be wired desktop telephone terminals or any other type of terminals capable of communicating with the switch 102. The word "terminal" as used herein should therefore be understood to include not only wired or wireless desktop telephone terminals, but also other types of processor-based communication devices, including but not limited to mobile telephones, personal computers, personal digital assistants (PDAs), etc.

The switch 102 is also coupled via trunk lines 110 to a public switched telephone network (PSTN) 112. The trunk lines 110 carry incoming calls from the PSTN 112 to the switch 102 for processing, and carry outgoing calls from the switch 102 to the PSTN 112. The trunk lines 110 are also referred to herein simply as "trunks." The PSTN 112 is coupled to one or more wireless networks 114, which have associated therewith terminals 116-1, 116-2, . . . 116-K.

It should be noted that the invention does not require any particular type of information transport medium between switch 102 and terminals 116, i.e., the invention may be implemented with any desired type of transport medium as well as combinations of different types of transport media. The one or more wireless networks 114 may include wireless cellular systems of a type well known in the art.

The terms "trunk" and "trunk line" as used herein should be understood to include POTS telephone lines, integrated services digital network (ISDN) lines, T1 lines or various portions or combinations of these and other types of transport media.

Each of the terminals 116-1, 116-2, . . . 116-K represents an external terminal not corresponding to any internal extension of the switch 102. These terminals are referred to as "external" in that they are not directly supported as terminal endpoints by the switch 102. Like the terminals 106, the terminals 116 may be wired or wireless desksets, mobile telephones, personal computers, PDAs, etc. The terminals 116 are an example of devices more generally referred to herein as "external endpoints."

Although shown as being connected to the wireless network(s) 114 in FIG. 1, one or more of the external terminals 116 could instead be connected directly to the PSTN 112. More generally, the present invention can be implemented using any desired type of external endpoint and network connection.

As will be described in greater detail below in conjunction with FIGS. 3, 4 and 5, the present invention in accordance with one aspect thereof configures the switch 102 so as to detect a voice path connection established in an external network between different trunk calls associated with a given external endpoint. Advantageously, this allows the switch to drop the trunk connections associated with one or more of the trunk calls, thereby increasing the call processing capacity of the switch and improving its ability to manage trunk-related system resources.

It should be emphasized that the configuration of the switch, user terminals and other elements as shown in FIG. 1 is for purposes of illustration only, and should not be construed as limiting the invention to any particular arrangement of elements.

Figure 2:
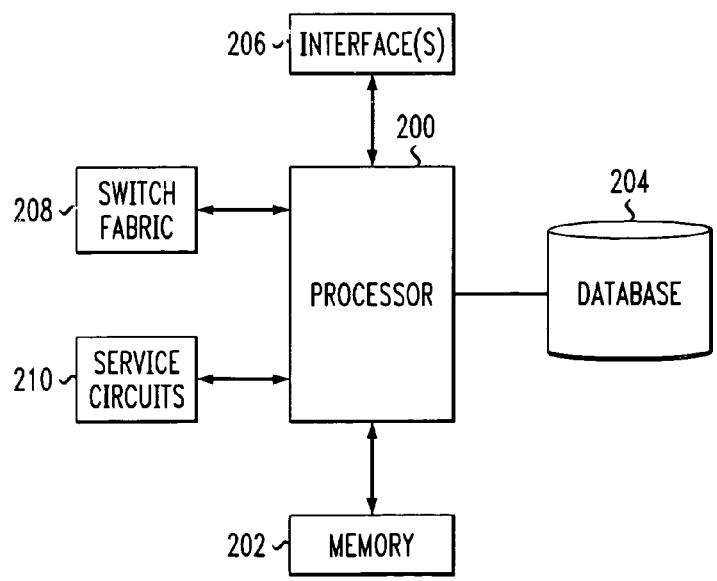
FIG. 2 is a block diagram showing one possible implementation of a switch of the FIG. 2 system.

FIG. 2 shows a more detailed view of one possible implementation of the switch 102 in the system of FIG. 1. The switch 102 in this implementation includes a processor 200, a memory 202, a database 204, one or more interfaces 206, a switch fabric 208, and a set of service circuits 210. The processor 200 may be implemented as a central processing unit (CPU), microprocessor, application-specific integrated circuit (ASIC) or other type of digital data processor, as well as various portions or combinations of such elements. The memory 202 may be a random access memory (RAM), a read-only memory (ROM) or combinations of these and other types of electronic memory devices.

The processor 200 operating in conjunction with the memory 202 executes one or more software programs for providing call processing functions within the switch 102. Such programs may be stored in memory 202 or another storage device accessible to the switch 102 and executed by processor 200 in a conventional manner.

The database 204 may be, e.g., an optical or magnetic disk-based storage device, or other conventional storage device associated with or otherwise accessible to the switch 102. The database 204 may be used to store, e.g., feature assignments to particular feature buttons or codes, directory number assignments to corresponding call appearances or direct facility termination keys, access restrictions, and other known administrative information regarding the configuration of the system 100, as well as other types of information.

The service circuits 210 may include tone generators, announcement circuits, etc. These circuits and the interfaces 206 are controlled by processor 200 in implementing call processing functions in the switch 102.

The switch 102 may include additional elements which are omitted from FIG. 2 for simplicity and clarity of illustration. For example, the switch may include a port card for each type of user terminal associated therewith. In addition, it will be appreciated by those skilled in the art that the switch 102 may be configured to support multiple user terminals of different types, e.g., wired deskset terminals, wireless deskset terminals, mobile telephones, personal computers, PDAs, video telephones or other advanced terminals, etc.

Also associated with the switch 102 may be an administrator terminal (not shown) which is used to program the operation of the switch 102 during a system administration, e.g., an initial set-up and configuration of the system or a subsequent system-level or user-level reconfiguration.

Other devices not shown in the figures may be associated with the switch 102, such as an adjunct feature server. Such an adjunct may be physically incorporated within the switch, and may be partially or completely implemented using other switch elements such as processor 200 and memory 202.

Figure 3:
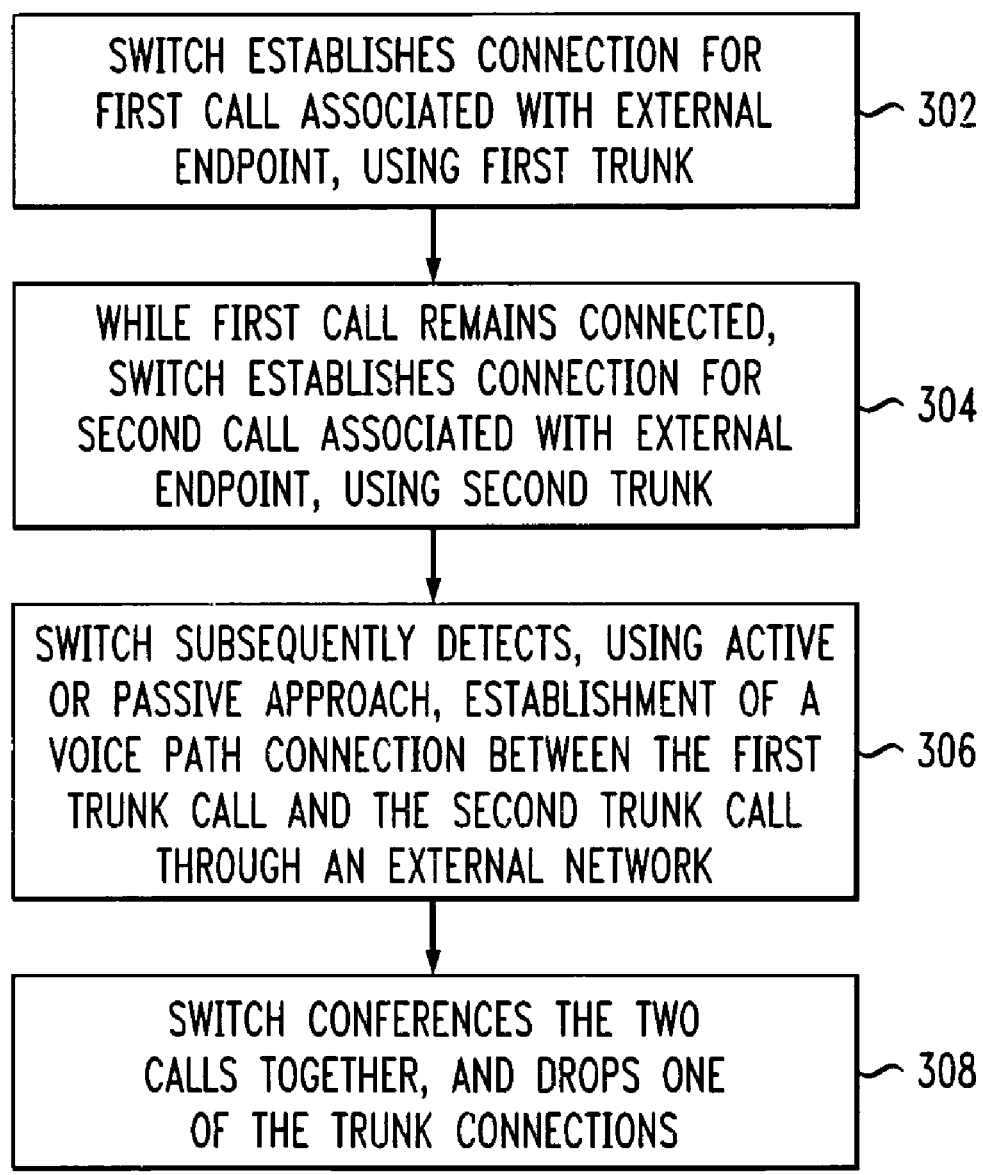
FIG. 3 is a flow diagram illustrating call processing operations performed by the switch in the system of FIG. 1 in accordance with the techniques of the invention.

FIG. 3 is a flow diagram 300 illustrating a call processing technique implemented in the system of FIG. 1 in accordance with the invention. In step 302, the switch 102 establishes a connection for a first call associated with an external endpoint, using a first one of the trunks 110. The external endpoint may be registered with the switch in the manner described in the above-cited U.S. patent application Ser. Nos. 09/908,155 and 09/908,156, such that the external endpoint is treated as if it were an internal switch extension. The external endpoint may thereby be provided with access to substantially all of the desirable switch features that are provided to the internal extensions.

By way of example, the switch may establish a connection for a given call by dynamically selecting from a set of external ports of the switch an available external port over which the call is directed via the corresponding trunk to the external endpoint. The dynamic selection may be based at least in part on a conventional automatic route selection (ARS) algorithm that dynamically allocates one of a number of available external trunks for use with the call.

As a more particular example of this type of dynamic selection arrangement, each of a plurality of external endpoints registered with the switch may be associated with a given ISDN primary rate interface (PRI) trunk group, such that when a call is to be delivered to a registered external endpoint, an available trunk line is selected from the associated trunk group and the call is routed over that line.

As another example, the switch may establish a connection for a given call by directing the call to an external port of the switch via a loop-back arrangement implemented between port cards of the switch. Alternatively, the loopback trunk arrangement may be eliminated and the call routed directly to an external port of the switch after application of the above-noted ARS algorithm or other suitable routing technique.

It should be noted that the invention does not require the use of any of these particular example techniques. Other call establishment techniques of a type known in the art may be used in conjunction with the invention.

Referring again to the flow diagram of FIG. 3, in step 304, while the first call remains connected via the first trunk, the switch 102 establishes a connection for a second call associated with the external endpoint, using a second one of the trunks 110. This second trunk may be selected using one of the techniques described above in the context of step 302, or other suitable call establishment technique.

The two calls associated with the external endpoint in this embodiment may comprise two incoming calls, two outgoing calls, or one incoming call and one outgoing call, where "incoming" denotes incoming to the external endpoint.

Although the FIG. 3 process will be illustrated for two calls, it should be understood that the techniques of the invention can be applied to situations involving more than two calls associated with a given external endpoint. These multiple calls may be any combination of incoming and outgoing calls.

As noted above, the present invention in accordance with one aspect thereof involves detecting a voice path connection established in an external network between different trunk calls associated with a given external endpoint, so as to permit the switch to conserve trunk-related resources by dropping one or more of the trunk calls. This portion of the process is illustrated in steps 306 and 308 of FIG. 3.

In step 306, the switch detects establishment of a voice path connection between the first trunk call and the second trunk call in an external network. For example, the voice path connection between the first trunk call and the second trunk call may be established by a user invoking a conference or transfer function at the external endpoint. The conference or transfer function involves the two trunk calls, and is provided by the external network, e.g., by an external wireless cellular network as in the illustrative arrangements of FIGS. 4 and 5. Exemplary active and passive techniques for voice path detection in the external network will be described below in conjunction with FIGS. 4 and 5, respectively.

In step 308, upon detection of the voice path connection between the first and second trunk calls, the switch conferences the two calls together within the switch, and then drops one of the trunk connections. As noted previously, this allows the conference or transfer to proceed using a reduced number of trunk lines, since the two calls involved have a voice path connection through the external network.

More detailed examples for each of the conference and transfer scenarios will now be described.

In an example conference scenario, the external endpoint is a mobile cellular telephone. It is assumed that the external endpoint is registered with the switch as previously described. A user receives an incoming call at the mobile telephone via the switch 102 over the connection established as in step 302. Further assume that the user wishes to conference in another party associated with the switch, and the cellular provider supports a three-party conferencing function. The other party associated with the switch may be, e.g., a party at an internal extension directly serviced by the switch, or a party at another external endpoint registered with the switch.

The user initiates the conference using the standard conference procedure associated with the mobile telephone. As a result, a second call is made to the desired party associated with the switch. Since the mobile telephone is registered as an external endpoint with the switch, the techniques described in the above-cited U.S. patent application Ser. Nos. 09/908,155 and 09/908,156 may be used to map the mobile telephone number to an assigned internal extension or other suitable identifier. The user completes the conference initiation procedure at the mobile telephone, and a voice path is then established between the first call and the second call through the external wireless cellular network. The two calls are thus tied together external to the switch and connected over a single voice path to the mobile telephone.

The switch determines, preferably shortly after the conference initiation procedure is completed, that the two calls are linked together via a voice path connection external to the switch. The switch then conferences the two calls together within the switch and drops the trunk connection for the call that no longer exists. To the cellular provider maintaining the external voice path connection between the two calls, it appears as if one of the parties has been dropped from the conference and that there is simply a two-party call at the mobile telephone. This is true despite the fact that the three-party conference is maintained through the conferencing within the switch. Therefore, the mobile telephone user is free to add more parties to the conference up to the switch maximum.

In an example transfer scenario, the mobile telephone user registered with the switch receives an incoming call via the switch 102. Assume that the user wishes to transfer the call to another party associated with the switch, and that the cellular provider supports call transfer.

The user initiates the transfer using the standard transfer procedure associated with the mobile telephone. As a result, a second call is made to the desired party associated with the switch. Since the mobile telephone is registered as an external endpoint with the switch, the techniques described in the above-cited U.S. patent application Ser. Nos. 09/908, 155 and 09/908,156 may be used to map the mobile telephone number to an assigned internal extension or other suitable identifier. The user completes the transfer procedure at the mobile telephone, and a voice path is then established between the first call and the second call through the external wireless cellular network. The two calls are thus tied together external to the switch and connected over a single voice path to the mobile telephone.

The switch determines, preferably shortly after the transfer procedure is completed, that the two calls are linked together via a voice path connection external to the switch. The switch then conferences the two calls together within the switch and drops the trunk connection for the call that no longer exists. To the cellular provider maintaining the external voice path connection between the two calls, it appears as if the call has ended. Upon detecting that the call has ended, the cellular provider will drop the other trunk connection. However, due to the conferencing in the switch, a two-party call is maintained with no external trunks involved.

It is to be appreciated that the foregoing are merely illustrative examples of the call processing techniques of the invention. Other techniques, associated with functions other than conferencing and transfer, may be used.

In the foregoing examples, the switch has no direct information regarding the particular conference or transfer operations that are occurring at the mobile telephone. It simply knows that there are two trunk calls associated with the mobile telephone.

The manner in which the switch 102 is configured to detect an external voice path connection between first and second trunk calls will now be described in greater detail in conjunction with FIGS. 4 and 5. Again, although two trunk calls are shown in these figures, the techniques disclosed can be readily extended to greater numbers of trunk calls.

As noted above, the detection techniques may be active or passive. Example active and passive detection techniques are shown in FIGS. 4 and 5, respectively. The active approach typically involves generating a specific signal on one trunk and listening for that signal on the other trunk. The passive approach simply monitors the two trunks to determine whether they are connected. It should be noted that other embodiments of the invention may use a combination of active and passive detection techniques.

Figure 4:
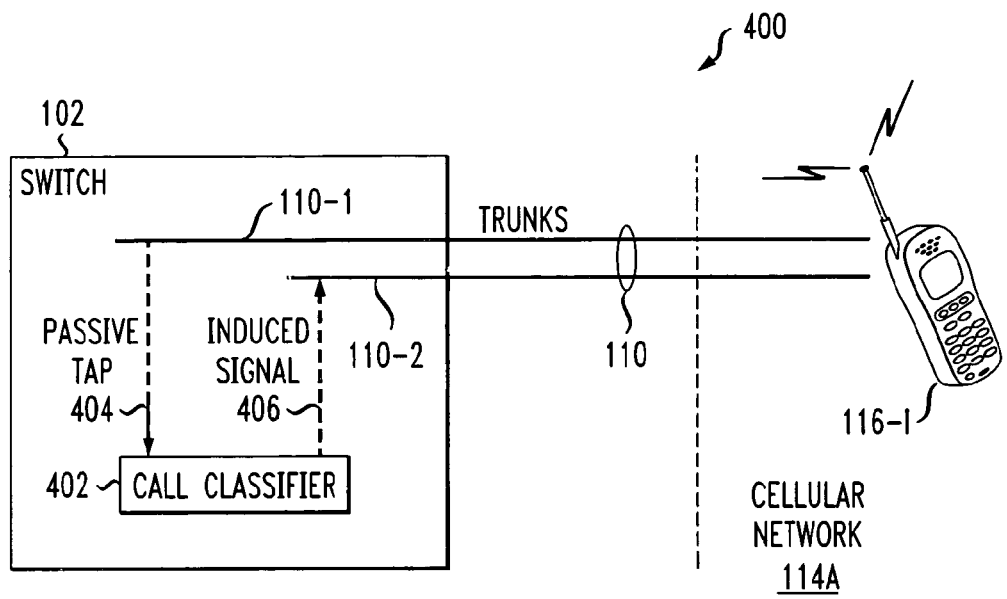
FIG. 4 is a diagram illustrating an active approach to detecting an external voice path connection between multiple trunk calls supported by a single external endpoint in accordance with the invention.

Referring now to FIG. 4, a communication system 400 includes switch 102 coupled via trunks 110 to a cellular network 114A. Associated with the cellular network 114A is an external endpoint 116-i, where i may be 1, 2, . . . or K. As illustrated in the figure, there are two trunk lines 110-1 and 110-2 being utilized to support corresponding first and second calls between the switch 102 and the external endpoint 116-i.

The switch 102 as shown includes a call classifier 402 which is coupled to trunk 110-1 via a passive tap 404 and is coupled to trunk 110-2 via an induced signal line 406. The call classifier 402 may be implemented at least in part in the form of software stored in memory 202 and executed by processor 200 of FIG. 2. The call classifier 402 may also or alternatively comprise one or more additional hardware elements other than those shown in FIG. 2.

In operation, the call classifier 402 generates a specific signal that is supplied via induced signal line 406 to the trunk 110-2, and "listens" for that signal on the trunk 110-1 via the passive tap 404 to determine if there is a voice path connection between the trunks. It is preferable in this embodiment that the voice path be end-to-end digital without compression, since significant distortion could make the induced signal undetectable. The induced signal may be a modulated or unmodulated signal. An example of an unmodulated signal is an added low volume tone pattern, e.g., a signal comprising multiple tones each at a volume level significantly below that of typical voice signal on the trunks. Those skilled in the art will recognize that numerous different signal types may be utilized to implement the active detection approach illustrated in FIG. 4.

Figure 5:
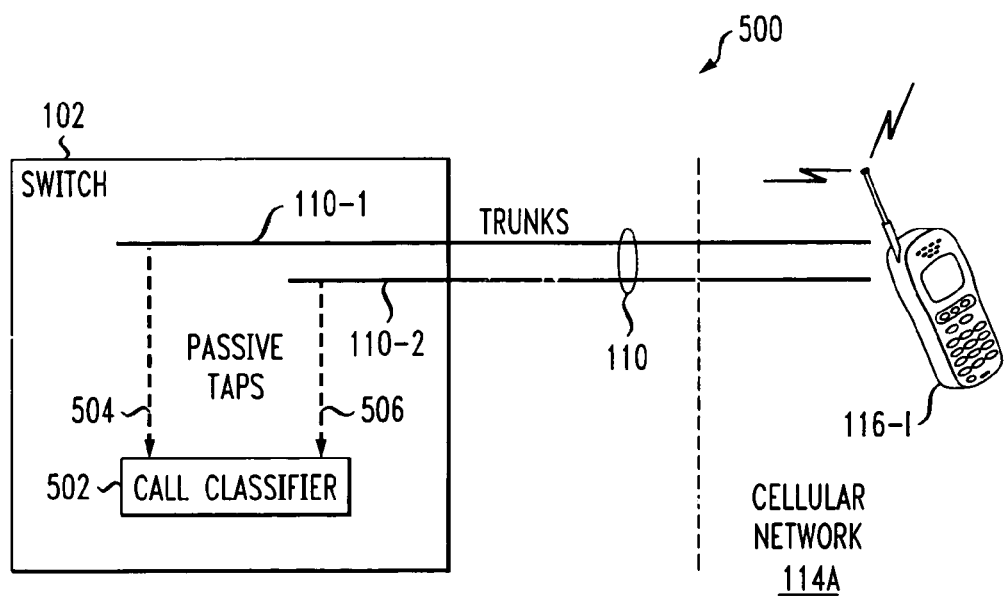
FIG. 5 is a diagram illustrating a passive approach to detecting an external voice path connection between multiple trunk calls supported by a single external endpoint in accordance with the invention.

The passive approach is illustrated by the arrangement shown in FIG. 5. A communication system 500 includes switch 102 coupled via trunks 110 to cellular network 114A. Associated with the cellular network 114A is the external endpoint 116-i. As illustrated in the figure, there are two trunk lines 110-1 and 110-2 being utilized to support corresponding first and second calls between the switch 102 and the external endpoint 116-i.

The switch 102 as shown includes a call classifier 502 which is coupled to trunk 110-1 via a passive tap 504 and is coupled to trunk 110-2 via a passive tap 506. Like the call classifier 402, the call classifier 502 may be implemented at least in part in the form of software stored in memory 202 and executed by processor 200, and may also or alternatively comprise one or more additional hardware elements other than those shown in FIG. 2.

In operation, the call classifier 502 monitors the signals on the trunks 110-1 and 110-2 via the respective taps 504 and 506 to determine if there is a voice path connection between the trunks. For example, the call classifier 502 may employ a modified echo cancellation algorithm which monitors the signals on both trunks until it detects one echoing the other, which would be indicative of a voice path connection. As another example, the call classifier 502 may be configured to detect simultaneous voice energy on both trunks. A potential drawback of the latter example is that a false indication of voice path connection could be triggered inadvertently by noise on the line, a preexisting conference on one of the calls, or other similar condition.

As previously noted, the call processing functions described above in conjunction with the illustrative embodiments of the invention may be implemented in whole or in part in the switch 102, e.g., in call processing software thereof utilizing processor 200 and memory 202. For example, the processing steps of FIG. 3 or the active or passive detection approaches of FIGS. 4 and 5 respectively may be implemented at least in part in the form of software executed by processor 200 and stored in memory 202. Other suitable combinations of hardware and/or software may be used to implement the call processing functions of the invention.

It should again be emphasized the above-described embodiments are illustrative only. Alternative embodiments may utilize different switch and terminal configurations, different types of internal and external endpoints, and different techniques for processing calls directed to terminals or other external endpoints not directly serviced by the switch.

For example, the invention, although illustrated in conjunction with mobile telephone external endpoints, is also well suited for use with external interactive voice response (IVR) units having ISDN interfaces, so as to provide a better level of integration between a PBX or other switch and an external IVR unit. Such IVR units are considered a type of external endpoint that may be utilized in conjunction with the invention.

These and numerous other alternative embodiments within the scope of the following claims will be apparent to those skilled in the art.

What is claimed is:

1. A call processing method in a communication system switch, the method comprising the steps of:
   establishing connections for at least a first call and a second call, the first and second calls both being associated with a common external endpoint, using respective first and second trunks; and
   upon detection of a voice path connection between the first and second calls in a network external to the switch, conferencing the first and second calls together within the switch and dropping at least one of the trunk connections.

2. The method of claim 1 wherein the switch detects the voice path connection by generating a designated signal on one of the first and second trunks and determining if the designated signal is detected on the other trunk.

3. The method of claim 2 wherein the voice path connection is end-to-end digital without compression.

4. The method of claim 2 wherein the designated signal comprises a modulated signal.

5. The method of claim 2 wherein the designated signal comprises an unmodulated signal.

6. The method of claim 5 wherein the unmodulated signal comprises a low volume tone pattern.

7. The method of claim 1 wherein the switch detects the voice path connection by monitoring the first and second trunks to determine whether they are connected in the external network.

8. The method of claim 7 wherein the switch determines that the first and second trunks are connected in the external network if one of the trunks is echoing a signal on another one of the trunks.

9. The method of claim 7 wherein the switch determines that the first and second trunks are connected in the external network if substantially simultaneous voice energy is detected on both trunks.

10. The method of claim 1 wherein the external endpoint does not require a fixed external port assignment in the switch.

11. The method of claim 1 wherein the connection establishing step for a given one of the first and second calls further comprises dynamically selecting from a set of external ports an available external port over which the call is directed via the corresponding trunk to the given external endpoint.

12. The method of claim 1 wherein the connection establishing step for a given one of the first and second calls further comprises directing the call to an external port of the switch via a loop-back arrangement implemented between port cards of the switch.

13. The method of claim 1 wherein the switch is configured such that the external endpoint is registered with the switch and the first and second calls are delivered to the external endpoint via respective external ports of the switch coupled to the respective first and second trunks.

14. The method of claim 1 wherein the external endpoint comprises a wireless terminal coupled to a wireless network external to a premises serviced by the switch.

15. The method of claim 1 wherein the external endpoint comprises a wired terminal coupled to a wired network external to a premises serviced by the switch.

16. The method of claim 1 wherein the switch comprises a private branch exchange (PBX).

17. A communication system switch for use in processing a call, the switch comprising:
   a memory; and
   a processor coupled to the memory;
   the switch being operative under control of the processor to establish connections for at least a first call and a second call, the first and second calls both being associated with a common external endpoint, using respective first and second trunks, and upon detection of a voice path connection between the first and second calls in a network external to the switch, to conference the first and second calls together within the switch and to drop at least one of the trunk connections.

18. An article of manufacture comprising a machine-readable storage medium storing one or more programs for use in call processing in a communication system switch, wherein the one or more programs when executed implement the steps of:
   establishing connections for at least a first call and a second call, the first and second calls both being associated with a common external endpoint, using respective first and second trunks; and
   upon detection of a voice path connection between the first and second calls in a network external to the switch, conferencing the first and second calls together within the switch and dropping at least one of the trunk connections.

* * * * *